United States Patent [19]

Wu

[11] 3,988,738
[45] Oct. 26, 1976

[54] DISPLAY DEVICE UTILIZING MAGNETIC STORAGE

[75] Inventor: Chin Tao Wu, North Brunswick, N.J.

[73] Assignee: RCA Corporation, New York, N.Y.

[22] Filed: Feb. 13, 1975

[21] Appl. No.: 549,666

[52] U.S. Cl. ........................... 346/74.1; 346/21; 360/82
[51] Int. Cl.² ............... G03G 19/00; G01D 15/12
[58] Field of Search ............. 346/74.1, 21; 178/6.6 A, 6.61; 360/82; 324/34 TA, 38

[56] References Cited
UNITED STATES PATENTS

| | | |
|---|---|---|
| 3,141,170 | 7/1964 | Wilkerson .......................... 346/74.1 |
| 3,161,544 | 12/1964 | Berry .................................. 346/74.1 |
| 3,370,546 | 2/1968 | Muller ................................ 346/74.1 |
| 3,735,416 | 5/1973 | Ott ...................................... 360/82 |

*Primary Examiner*—Bernard Konick
*Assistant Examiner*—Jay P. Lucas
*Attorney, Agent, or Firm*—Edward J. Norton; Raymond E. Smiley

[57] ABSTRACT

An electromagnetic transducer in the form of a single wire shaped as a one-turn helix records a signal pattern on a web of magnetic material. The portion of the web including the recorded signal pattern thereafter passes opposite a magnetic fluid layer to provide an optical display.

5 Claims, 4 Drawing Figures

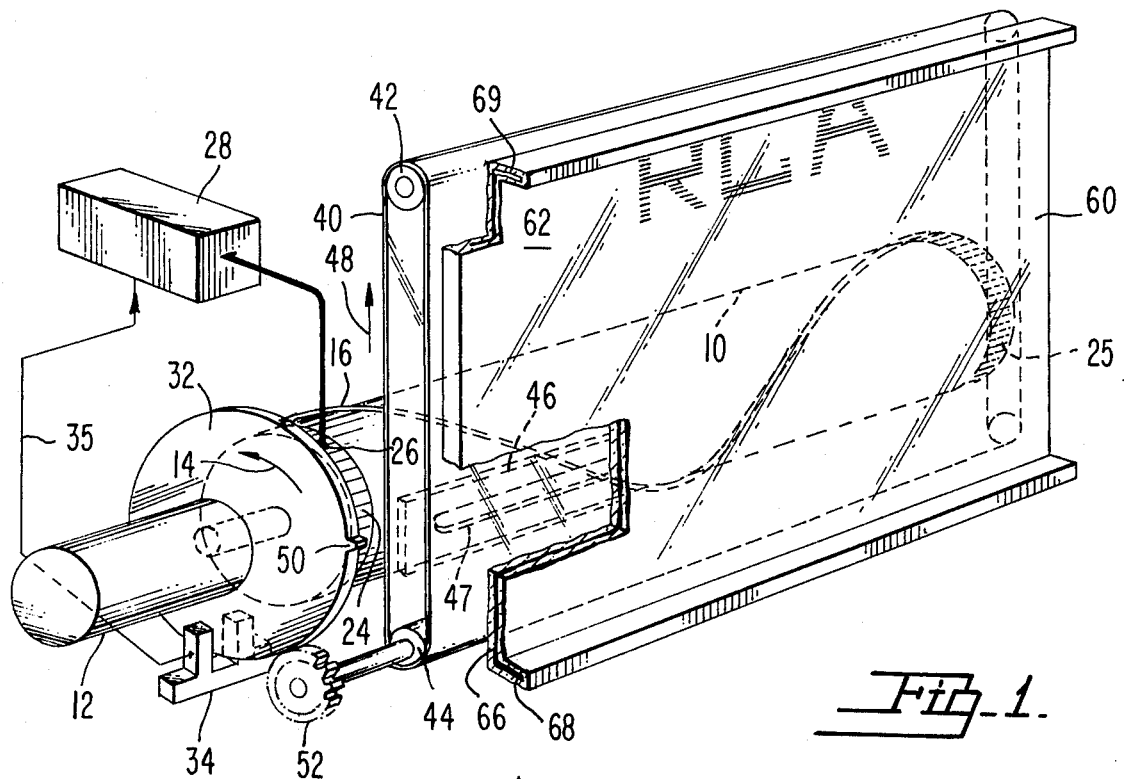
Fig_1.
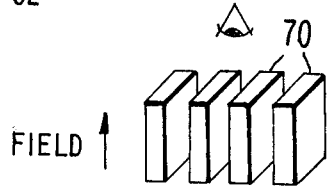
Fig_3a_
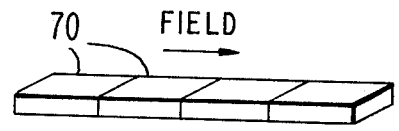
Fig_3b_
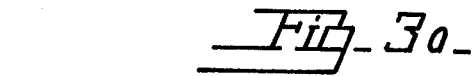
Fig_2_
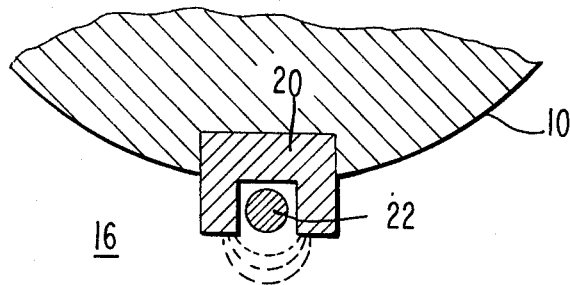

DISPLAY DEVICE UTILIZING MAGNETIC STORAGE

BACKGROUND OF THE INVENTION

A need exists for a low cost erasable display capable of receiving serial electrical signals and creating a visual image. A cathode ray tube device meets all of the criteria except for cost. U.S. Pat. No. 3,304,073, issued Apr. 11, 1967, to E. F. Littau, describes a device for producing a visual display from serially provided signals. However, the display material employed is not by its nature erasable, presenting disposal problems of the used material. Further, the display material must be replenished periodically. Such replenishment is difficult, especially if the user is not experienced. As an example, such displays are often used by children for educational purposes, and children are generally not capable of replenishing the display material.

SUMMARY OF THE INVENTION

A display device includes a rotating cylinder having along its periphery a one turn helix and also includes an elongated web of magnetic material positioned opposite serially presented points of the helix to receive magnetic signals therefrom. A means is also included for applying signals to the transducer as the cylinder rotates for creating a magnetic signal pattern across the web. Additional means advance the web as the cylinder rotates so that signal patterns are created on successive lines on the web. A magnetic-to-visual transducer means in proximity to the portion of the web bearing the recorded signal patterns produces a visual display corresponding to the signal patterns.

BRIEF DESCRIPTION OF THE DRAWING

FIG. 1 is a perspective diagram of one embodiment of the invention;

FIG. 2 is a cross-section of an electromagnetic transducer useful in practicing the invention;

FIGS. 3a and 3b illustrate respectively magnetic particles in first and second view orientations.

DETAILED DESCRIPTION

Referring to FIG. 1, a drum 10 (shown partially in phantom) is adapted to be rotated by a drive means such as motor 12 in the direction indicated by arrow 14. An electromagnetic transducer 16 in the form of a one-turn helix (also shown partly in phantom) is attached to the surface of drum 10. As seen in FIG. 2, transducer 16 may comprise a high $\mu$ material 20 having a C-shaped cross-section attached to drum 10 and a solid conductor 22 such as a copper wire imbedded along the hollow portion of material 20 by any suitable means such as epoxy. Such an arrangement causes the flux about the wire 22 to be generally restricted to a small area directed radially from the drum 10.

Returning to FIG. 1, one end of transducer 16 may be connected to a conducting ring 24 located at one end of drum 10. A brush or other electrically conductive pick-up device 26 in contact with conducting ring 24 is coupled to a signal source 28 and is adapted to provide electronic signals to ring 24 and thus to transducer 16. Signal source 28 may be any suitable source, such as a general purpose computer, a punch paper tape apparatus, etc., of electronic signals including alphanumeric display binary signals. A second conducting ring 25, located on the opposite end of drum 10 from that on which ring 24 is located is coupled to a source of reference potential such as ground.

A timing disc 32 is also coupled to drum 10 to be rotated therewith and is arranged to rotate in proximity to a pick-up device 34, which may, for example, be optical or magnetic in nature as is well known to those familiar with the art. Pick-up device 34 is also coupled by suitable means represented as lead 35 to the signal source 28 to provide timing signals thereto.

An endless elongated web 40 of magnetic material such as magnetic coated mylar tape passes over two guide rollers, 42, 44, the rollers being positioned such that a portion of the mylar tape lies parallel to the rotational axis of drum 10 proximate to transducer 16. A high $\mu$ shield 46 having a narrow elongated slot 47 may be positioned between transducer 16 and web 40 to direct signals from conductor 22 more directly toward web 40. A means is provided for advancing web 40 in the direction illustrated by arrow 48 in synchronism with the rotation of drum 10, but at a much slower speed. One way of accomplishing the advance is to provide a single gear tooth 50 on drum 10 and to provide a mating, multitoothed gear 52 on roller 44. Each time drum 10 makes one revolution, web 40 is advanced one line. The pitch of the lines will be determined by the desired display resolution but ideally will be on the order of the cross-sectional dimension of conductor 22, FIG. 2. Alternatively, there may be provided a drive means for continually driving web 40 such that it advances one line as drum 10 makes one revolution. Such an arrangement will cause the information to be slanted slightly, but for all practical purposes, this is not noticeable.

Web 40, after being moved past the drum-transducer assembly, passes adjacent to a display panel 60, which includes a transparent viewing screen 62 behind which is a hollow chamber containing ferrous particles in suspension in a suitable fluid, illustrated as a solid black line 66. The fluid ideally is transparent and of the same density as the suspended particles. Additional fluid is present at the lower boundary 68 of the display. A hollow portion 69 at the upper boundary of the display receives excess fluid 66 caused by expansion. The particles 70, as illustrated in FIG. 3, may be rectangular in shape and similar to the slats of a venetian blind. There are many ways to make these particles. One of the ways is to evaporate the ferrous oxide material through a mask onto a glass surface and then remove the particles as formed. With a magnetic field on web 40 oriented in one direction, only the edges of particles 70 are visible (see FIG. 3a), so that the color of the material forming the back wall of the chamber, the wall nearest web 40, is visible. In one embodiment the back wall is covered with aluminum foil to reflect light incident upon the display. With the magnetic field on web 40 oriented in the image producing direction, the sides of the particles 70 are visible (see FIG. 3b) so that the color of the magnetic particles is displayed on transparent surface 62.

Operation of the display device is as follows: Motor 12 rotates drum 10 continuously. A special mark on timing wheel 32 is detected by pick-up device 34, which sends an initialization signal to signal source 28. This signal indicates that the left edge (as illustrated in FIG. 1) of transducer 16 is adjacent mylar loop 40. Concurrently, then, as drum 10 continues to revolve, signal source 28 provides, seriatum, signals of one or another polarity to transducer 16, causing consecutively a narrow band or track of magnetic signal energy of one polarity or another to be recorded on web 40 directed through the slot 47 in high μ shield 46. As new information is being applied to web 40, old information previously recorded at that portion of the web 40 is automatically erased by the operation of the transducer 16.

After the drum has made substantially one revolution so that the left edge of transducer 16 is about to approach slot 47 in shield 46, the single tooth 50 on drum 10 engages gear 52 to advance web 40 one line, for example, about an amount equal to the width of slot 47 in shield 46. As drum 10 continues to rotate, additional lines of magnetic signal patterns are impressed on web 40 until information previously recorded rotates behind the front screen 62 of the display panel 60. As illustrated, the bottom portion of letters R, C, and A are created by the polarity of the magnetic signal on web 40 such that the particles in the fluid behind the screen 62 adopt the position shown in FIG. 3b. In other areas of the display, the particles are as shown in FIG. 3a. For purposes of illustration, succeeding lines and information are separated by spaces. In reality, succeeding lines would be immediately adjacent or even overlapping each other. As the web 40 is moved, the visible image moves downward in the embodiment of FIG. 1. Given particles in the display fluid 66 tend not to move along the display screen 62, but rather tend to stay in one place becoming oriented as illustrated in FIG. 3a or 3b depending on the polarity of adjacent magnetic flux on web 40. As the web 40 again moves past the drum-transducer assembly, the same magnetic pattern may be reinstated or the previously recorded magnetic pattern replaced by a new magnetic pattern, and, thus, a new image to be displayed. After a full screen of information has been printed and moved into view behind display panel 60, it may be desirable to stop motor 12 allowing letters, pictures and the like to be viewed for some time. If less than a full screen of information is to be presented, it may be desirable to have additional means (not shown) for advancing rapidly mylar web 40 into the viewing position after all the desired information has been transferred to the web from signal source 28.

What is claimed is:

1. A display apparatus comprising in combination:
   a rotating cylinder having along the periphery thereof an electrically energized electromagnetic transducer in the form of a helix;
   means for moving an elongated web of magnetic material opposite said helix to receive magnetic signals from serially presented points therefrom;
   means for applying electric signals to said transducer in synchronism with the rotation of said cylinder, said web being moved so that as said cylinder rotates successive magnetic signal patterns are recorded by said transducer on successive portions of said web; and
   magnetic-to-visual transducer means in proximity to said web bearing said magnetic signal patterns for producing a visual display corresponding to said signal patterns.

2. The combination as set forth in claim 1, wherein said transducer is in the form of a one-turn helix.

3. The combination, as set forth in claim 1, wherein said magnetic-to-visual transducer means comprises parallel first and second walls forming a hollow chamber, said first wall being in proximity to portions of said web bearing said signal patterns, said second wall being transparent and positioned to be visible to a viewer, and additionally comprising in said chamber ferrous particles in suspension, said particles assuming visually different orientations depending upon the magnetic pattern on the portion of said web proximate said particles.

4. The combination as set forth in claim 2, wherein said cylinder is part of said means to move said web and operates to move said web a unit distance after each revolution of said cylinder.

5. The combination as set forth in claim 1, wherein said web is in the form of an endless web whereby, after said signal patterns have been displayed, said web with said signal patterns is again moved opposite said helix allowing new signal patterns to be recorded.

* * * * *